July 16, 1935.　　　J. W. PLACE ET AL　　　2,008,627
ELECTRICAL EQUIPMENT FOR GAUGES
Filed Jan. 21, 1932　　　2 Sheets-Sheet 1
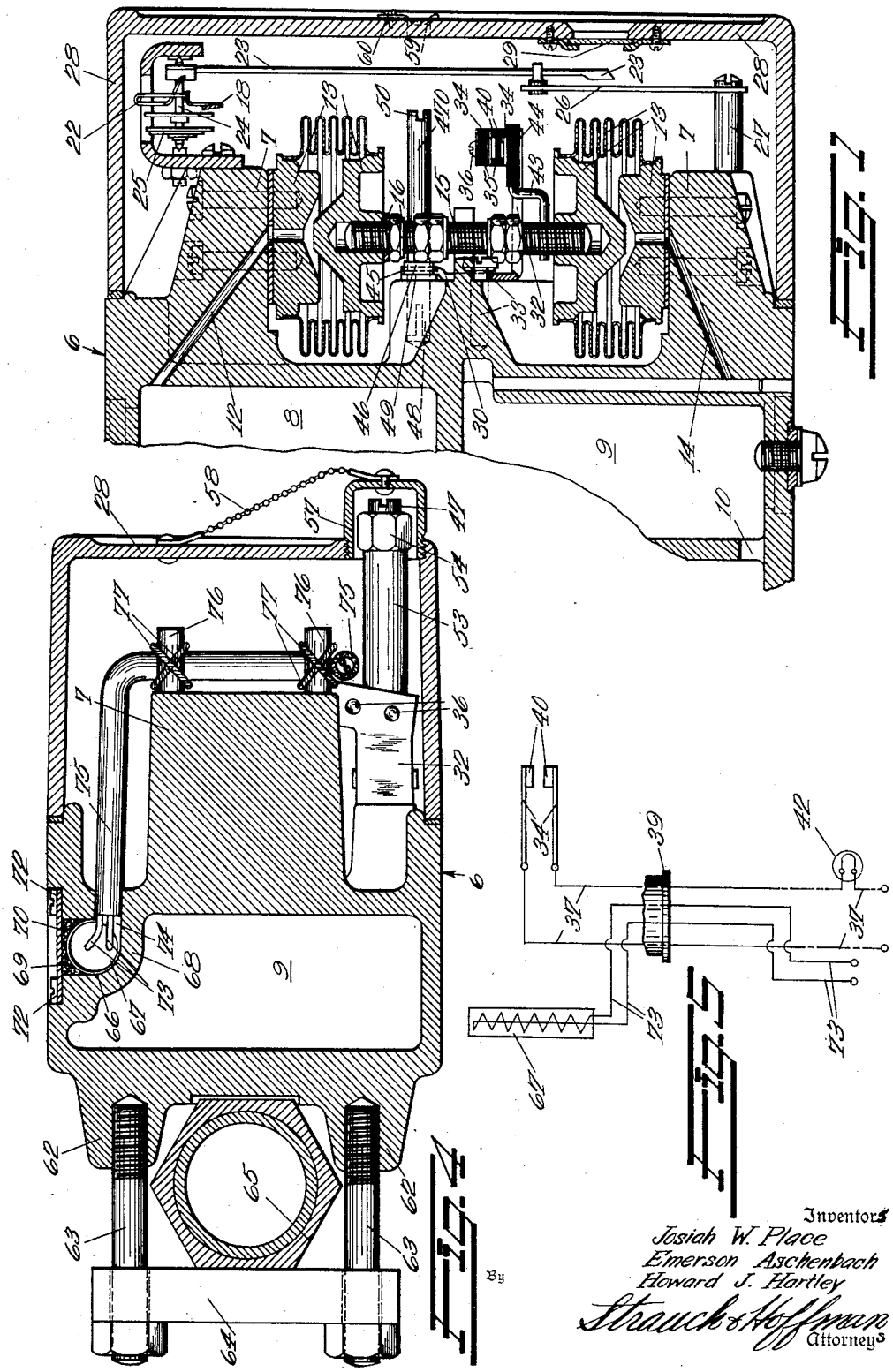
Inventors
Josiah W. Place
Emerson Aschenbach
Howard J. Hartley
Strauch & Hoffman
Attorneys July 16, 1935. J. W. PLACE ET AL 2,008,627
ELECTRICAL EQUIPMENT FOR GAUGES
Filed Jan. 21, 1932 2 Sheets-Sheet 2
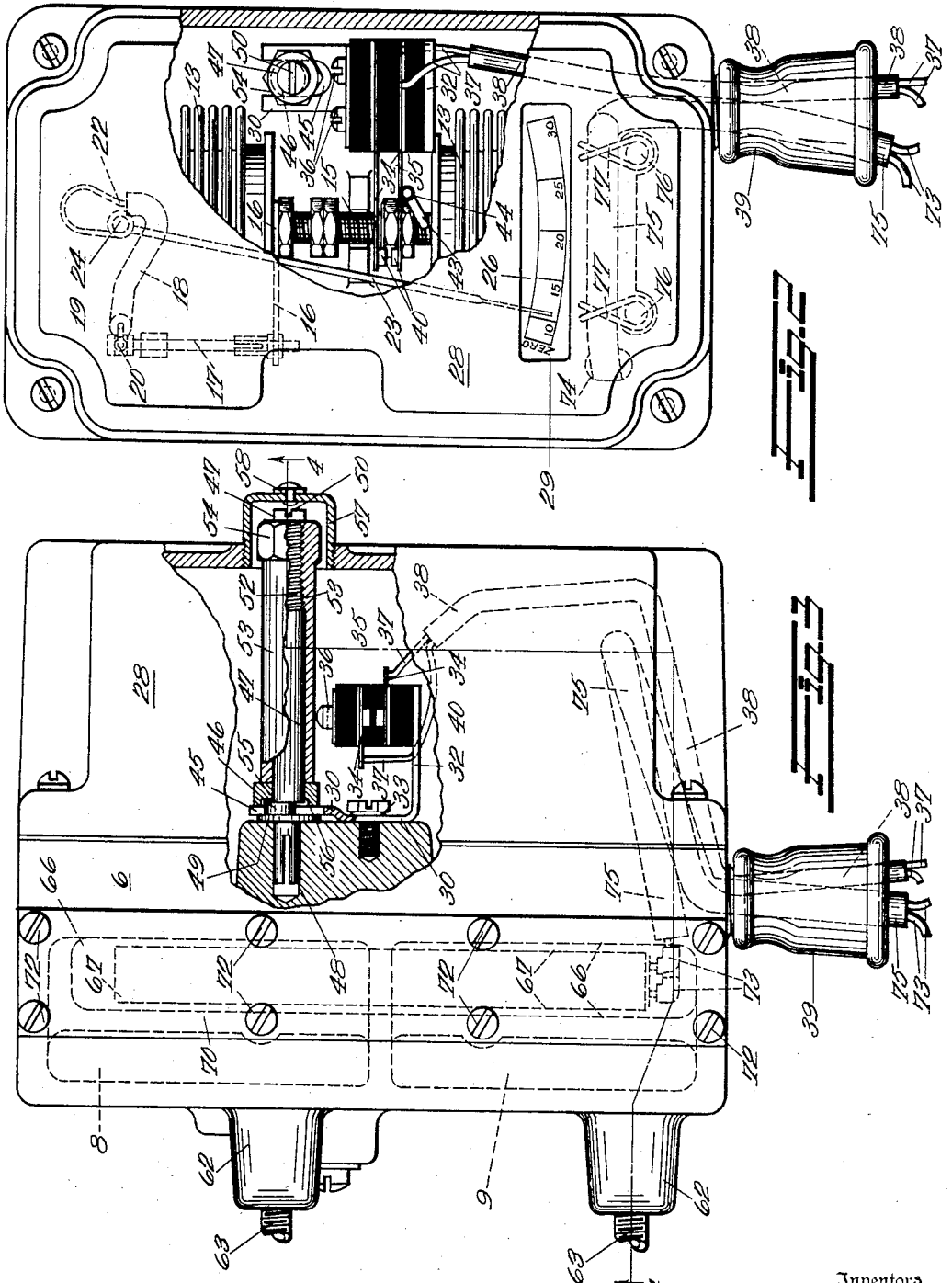
Inventors
Josiah W. Place
Emerson Aschenbach
Howard J. Hartley
By Strauch & Hoffman
Attorneys Patented July 16, 1935

2,008,627

UNITED STATES PATENT OFFICE 2,008,627

ELECTRICAL EQUIPMENT FOR GAUGES

Josiah W. Place, West Orange, N. J., Emerson Aschenbach, Sellersville, and Howard J. Hartley, Lansdale, Pa., assignors to United States Gauge Company, Sellersville, Pa., a corporation of Pennsylvania Application January 21, 1932, Serial No. 588,020

2 Claims. (Cl. 73—110)

This invention relates to electrical equipment for gauges and, more particularly, is concerned with electric circuits utilized to indicate a predetermined condition of the medium to which a gauge is responsive; and to prevent any liquid, with which the gauge may be associated, from congealing or becoming too viscous.

The present invention is especially concerned with pressure-responsive instruments such, for example, as the differential pressure gauge disclosed in copending application, Serial Number 471,562, filed July 29, 1930. A portion of the pressure-gauge structure of that application is reproduced here for purpose of illustration and will be described later.

It is a major object of the present invention to provide a new and improved signaling or indicating mechanism for association with a gauge. In this connection, it is an important object to provide the signaling mechanism with means for conveniently and accurately adjusting it for response to any one of a large number of operating conditions to which the gauge may be subjected, and to provide means for easily locking the adjusting means against inadvertent movement.

In some types of gauges it may be desirable to insert an air trap between the pressure-responsive element and the source of fluid supply. If the fluid comprises a corrosive liquid it should be kept out of contact with the gauge parts, and if the liquid carries any sediment in suspension care should be taken to prevent the deposition and accumulation of this foreign matter within the gauge structure. For example, in the above mentioned copending application, Serial Number 471,562, there is disclosed and claimed a differential pressure gauge embodying air traps in communication with a pair of bellows and to which a pair of fluid lines are connected. The fluid lines may be connected into a liquid flow line at different points to cause the instrument to function as a flow indicator. The air traps prevent the liquid from reaching the bellows, but some of the liquid may enter the air traps or chambers and become liable to freeze or stiffen therein and thus either render the instrument inoperative or decrease its sensitivity and speed of indication.

It is one of the main objects of the present invention to equip a gauge with an electrical unit for preventing any static associated liquid from freezing or becoming too viscous, and especially to provide a heating circuit for incorporation in a differential pressure gauge of the character above discussed.

These and other objects of this invention will fully appear from a study of the following detailed description and appended claims, when taken in conjunction with the accompanying drawings, wherein:

Figure 1 represents a vertical longitudinal section taken centrally of one embodiment of the present invention.

Figure 2 is a face view of a further structural embodiment of this invention, with a portion of the cover plate broken away.

Figure 3 is a side view, in partial section, of the device seen in Figure 2, with the pressure-responsive mechanism removed for clarity of illustration, and with the revealed internal mechanism slightly enlarged for the same reason.

Figure 4 is a horizontal sectional view of the device of Figures 2 and 3, as seen when looking upon the plane of line 4—4 of Figure 3 in the direction of the arrows.

Figure 5 constitutes a diagrammatic illustration of the electrical circuits employed in the signaling and heating systems of the other views.

With continued reference to the drawings, wherein like numerals are employed to designate like parts, and with particular reference for the moment to that form of invention illustrated in Figure 1 but which in most respects is substantially the same as the embodiment of the other views:

The numeral 6 designates a supporting block in the form of a casting having a pair of vertically spaced lugs 7 on one of its sides. A pair of chambers 8 and 9 are formed in the opposite side of the block to provide air traps, these chambers being designed for connection with a source or sources of fluid pressure by way of ports 10. A passage 12 is provided in the casting between the chamber 8 and the lower face of the upper lug 7, this passage opening into said chamber at the top thereof in order that only clean entrapped air may serve to transmit pressures from the chamber to a corresponding pressure-responsive bellows assembly 13 that is secured to the upper lug 7. In like manner a passageway 14 opens into the top of the chamber 9 and extends through the lower lug 7 into communication with a second pressure-responsive assembly 13 carried by the latter.

The bellows assemblies 13 are aligned and interconnected by a threaded bolt 15 to form a differential pressure-responsive mechanism. An arm 16, forming a part of an indicating movement about to be described, is clamped upon the bolt 15 for reciprocation therewith in response to variations in the differential pressures. When the pressures in the chambers 8 and 9 (and hence in the bellows assemblies) are equal, no movement of the bolt and arm takes place, but if one pressure exceeds the other, the bolt and arm will be moved in a direction corresponding to the greater thrust and with a magnitude proportionate to the pressure differential. The mechanism actuated by the arm 16 is alike in both illustrated embodiments and hence reference will now be had to Figure 2 as well as Figure 1, for a brief description of that mechanism.

The movement mechanism comprises a rod 17 connected to the arm 16 and hence designed to reciprocate in response to movement of the latter; and a pointer actuating lever 18 pivoted between its ends at 19, flexibly connected to the rod at one end as at 20 and having its other end freely engaging the curved tail arm 22 of a pointer 23 that is pivoted upon the block by a spindle 24. The pointer therefore oscillates as the lever 18 swings about its fixed pivot 19 in response to reciprocation of the rod 17 in one direction. A hair spring 25 imparts movement to the pointed in the opposite direction. A scale 26 is provided to indicate the degree of pointer oscillation, this scale being supported on the block by a post 27.

A cover 28 is provided for cooperation with the block to house the movement and the pressure-responsive mechanism. This housing has a window 29 through which the pointer and scale readings may be viewed.

An electrical signaling system preferably is associated with the instrument to render a visible or audible signal at a point outside or remote from the instrument for the purpose of indicating that a predetermined pressure differential exists. As illustrated in both forms of the invention, an L-shaped bracket bar comprising vertical and horizontal legs 30 and 32 respectively, is pivoted upon the block 6 by a screw and washer assembly 33. The leg 32 has a pair of flexible copper strips 34 mounted on its free end, these strips being spaced and insulated with respect to each other and the leg by a number of small sheets of non-conducting material 35. The assembly of strips and sheets is clamped against the leg by screws 36, with the free ends of the strips projecting to a position adjacent the bolt 15. The secured ends of the strips are connected with a pair of feed wires 37 housed within a conduit 38 that is led into the housing by way of a coupling element 39 which is screwed into the block 6.

The free ends of the copper strips are provided with complemental contact points 40 which, when brought into engagement will close a circuit and thus actuate a signal or alarm device at some point outside the instrument. For example, in Figure 5 there is schematically illustrated a circuit arrangement wherein a lamp 42 is utilized to provide a visible signal at a point remote from the instrument whenever the points 40 are in contact. The latter normally are out of contact but are adapted to be brought together when a predetermined pressure differential exists. For example, in the drawings the points are about to be engaged and contact will be made when the pointer reaches zero position because of the pressure exerted against one of the copper strips 34 by an actuating stem 43 rigidly carried by the bolt 15. The stem is sheathed by a rubber sleeve 44 to prevent short-circuiting. Obviously, the actuating stem may be rearranged, if desired, to close the contact gap when the pressure differential reaches or exceeds a predetermined value above zero. Likewise it may in some instances be desirable to modify the signal system so that a signal will be rendered only when the circuit is open.

The alarm mechanism may be adjusted for proper operation or to obtain a signal at any one of an infinite number of pressure conditions. This adjustment is made possible by the inclusion of the pivotal mounting of the bracket bar, whereby the latter may be swung to vary the relative positions of the copper strips 34 and the stem 43. The free end of the pivoted leg 30 of the bracket bar is provided with a slot 45 which receives a rotatable cylindrical cam 46. The cam operating mechanisms differ in the two forms of the invention and hence will be separately described.

In that embodiment illustrated in Figures 2 and 3 the cam 46, fitted in the fork formed by the slot 45, is formed integral with, and eccentric to, a stem 47. The latter has a split end 48 set into the block 6 with a tight frictional fit to yieldingly resist rotation of the stem, and an annular shoulder 49 is formed on the stem adjacent the cam for engagement with the block 6. The outer or free end of the stem 47 has a cross-slot 50 for cooperation with a screw driver, whereby the stem may be turned to rotate the cam 46. Shifting of this eccentric cam causes the leg 30 to swing about its pivot and thus move the copper blades 34 toward or away from the rubber sleeve of the actuating stem 43.

Means are provided for locking the eccentric cam 46 against rotation relative to the forked arm 30, as follows: The outer end of the stem 47 is externally threaded at 52 to receive the internally threaded end of a locking sleeve 53 which surrounds the stem. The outer end of this sleeve has a hexagonal head 54 for cooperation with a tool to screw or unscrew the sleeve axially of the stem. A locking washer 55, recessed on one side at 56 to permit unhampered adjustment of the cam 46, is positioned between the sleeve 53 and the stem shoulder 49, the edge of the recessed side of the washer being in contact with the forked end of the bracket arm 30. After each adjustment of the stem 47, the sleeve 53 may be tightened to draw the shoulder 49 and washer 55 axially toward each other into firm engagement with the forked arm, thus to lock the stem 47 against rotation and at the same time to lock the arm against swinging movement with respect to the block 6 (in which the stem end 48 is mounted without lateral play).

The stem 47 and sleeve 53 are sufficiently elongated to have the slot 50 and head 54 respectively located in positions for convenient manipulation by tools from the outside of the cover plate 28. To this end the cover 28 is apertured and provided with a small cap 57 carried on a chain 58 and detachably fitted within the aperture to close the latter after each adjusting operation.

The adjusting mechanism of the modified form disclosed in Figure 1, differs from that already described only in that no positive lock is provided and that the outer end of the adjusting stud, 47a, is disposed wholly within the housing and hence not readily subject to tampering or inadvertent rotation. There is a hole 59 in the cover in alignment with the stud and through which a screw driver may be inserted for conveniently accomplishing the adjusting operation without removal of the cover 28. A resilient pivoted closure element 60 normally is swung and snapped into position to close the hole 59. The frictional resistances of the pivotal devices 33 and 48 are relied upon to prevent undesired rotation of the cam 46 and bracket arm 30.

The rear side of the block 6 has lugs 62 which receive stud bolts 63 that cooperate with bars 64 to clamp the instrument upon a support such, for example, as a portion 65 of a liquid flow line. (See Figures 3 and 4.) When operating in this vertical position, there may be some liquid standing in the lower ends of the trap chambers 8 and 9; and when the instrument is disposed in an atmosphere of low temperature, this standing liquid may become either so viscous as to retard the transmission of pressure variations to the pressure-responsive mechanism, or congealed to render the instrument completely inoperative. Means is provided to prevent these undesirable results, as follows.

As seen in Figures 3 and 4, a vertical channel 66 is formed or recessed in the cast block 6 in such manner that it closely parallels the aligned air chambers 8, 9, and opens directly outwardly through the rear face of the block. A single elongated electrical resistance unit 67 is inserted laterally of the channel and is shaped to fit snugly within the trough of the latter so as to transmit heat efficiently to the chambers 8, 9 by way of the relatively thin wall 68 which separates the latter from the channel. An asbestos packing 69 is held against the heating unit by a closure plate 70 which is secured to the block by screws 72.

A pair of feed wires 73 are connected to the lower end of the heating unit and led through a hole 74 into the space between the block 6 and the cover 26. A conduit 75 receives these wires and carries them around the lower one of the block lugs 7 and thence out of the instrument housing by way of the same coupling member 39, that forms a passageway for the feed wires of the signaling system. A pair of posts 76 are mounted in the lower lug 7 and the conduit 75 is tied to these posts by binding cord 77.

The electrical circuit of the heating system is included in the diagrammatic disclosure of Figure 5.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A differential pressure gauge construction comprising a pair of inter-connected pressure-responsive mechanisms; a block for supporting said mechanisms and providing a pair of chambers connected respectively to said mechanisms and each connected to a source of liquid to transmit the pressure of the latter to its corresponding pressure-responsive mechanism; a heating unit common to said chambers to prevent the congelation of any liquid standing in the latter; a recess formed in said block for reception of said heating unit; and a closure plate cooperating with said recess to conceal the heating unit and hold it in position.

2. In combination, in an instrument having indicating mechanism, a housing structure adapted to receive a relatively static liquid for transmitting variations in a given condition to said indicating mechanism, there being a recess formed in a portion of said housing structure, a heating element disposed within and partially filling said recess, and an insulating member fitted between said heating element and the outer surface of said recessed portion to maintain said element in position in the bottom of the recess.

JOSIAH W. PLACE.
EMERSON ASCHENBACH.
HOWARD J. HARTLEY.